US008856585B2

(12) United States Patent
Bauer et al.

(10) Patent No.: US 8,856,585 B2
(45) Date of Patent: Oct. 7, 2014

(54) HARDWARE FAILURE MITIGATION

(75) Inventors: Eric J. Bauer, Freehold, NJ (US);
Randee S. Adams, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 433 days.

(21) Appl. No.: 13/195,482

(22) Filed: Aug. 1, 2011

(65) Prior Publication Data
US 2013/0036322 A1    Feb. 7, 2013

(51) Int. Cl.
*G06F 11/00* (2006.01)
*H04L 29/14* (2006.01)
*H04L 12/24* (2006.01)
*G06F 11/20* (2006.01)
*H04L 29/08* (2006.01)

(52) U.S. Cl.
CPC ............. *G06F 11/203* (2013.01); *H04L 69/40* (2013.01); *H04L 41/0668* (2013.01); *G06F 11/2035* (2013.01); *H04L 67/1029* (2013.01); *H04L 41/0659* (2013.01); *G06F 11/2048* (2013.01); *H04L 67/1034* (2013.01); *H04L 67/28* (2013.01)
USPC .......................................................... 714/4.2

(58) Field of Classification Search
CPC   G06F 11/2028; G06F 11/203; G06F 11/2033
USPC .......................................................... 714/4.2
See application file for complete search history.

(56) References Cited

U.S. PATENT DOCUMENTS

| 6,195,760 | B1 * | 2/2001 | Chung et al. ............ 714/4.1 |
| 6,421,787 | B1 * | 7/2002 | Slaughter et al. ........ 714/4.1 |
| 8,479,038 | B1 * | 7/2013 | Patil ......................... 714/4.2 |
| 2001/0032324 | A1 * | 10/2001 | Slaughter et al. ........... 714/4 |
| 2003/0041283 | A1 * | 2/2003 | Murphy et al. ............. 714/13 |
| 2006/0271813 | A1 * | 11/2006 | Horton et al. ................ 714/4 |
| 2008/0126833 | A1 * | 5/2008 | Callaway et al. ............ 714/4 |
| 2009/0006885 | A1 * | 1/2009 | Pattabhiraman et al. ..... 714/4 |
| 2012/0124413 | A1 * | 5/2012 | Bauer et al. ............. 714/4.11 |
| 2012/0144229 | A1 * | 6/2012 | Nadolski ................. 714/4.2 |

FOREIGN PATENT DOCUMENTS

| EP | 0981089 A2 | 2/2000 |
| WO | 02/01347 A2 | 1/2002 |

OTHER PUBLICATIONS

International Search Report Dated Oct. 11, 2012 for PCT/US2012/044283.

* cited by examiner

*Primary Examiner* — Joshua Lohn
(74) *Attorney, Agent, or Firm* — Kramer & Amado, P.C.

(57) ABSTRACT

Various exemplary embodiments relate to a method and related network node including one or more of the following: detecting, by a resource allocation device, a failure of server hardware; identifying a first agent device that is configured to utilize the server hardware; and taking at least one action to effect a reconfiguration of the first agent device in response to the server hardware failure. Various embodiments additionally include one or more of the following: identifying a second agent device that is configured to utilize the server hardware; and taking at least one action to effect a reconfiguration of the second agent device in response to the server hardware failure. Various embodiments additionally include one or more of the following: receiving, by the resource allocation device from a second agent device, an indication of the failure of server hardware, wherein the second agent device is different from the first agent device.

30 Claims, 4 Drawing Sheets

| | 305 | 310 | 315 | 320 |
|---|---|---|---|---|
| 300 | Agent Device ID | Processor Resources | Memory Resources | Device Image |
| 330 | 0x23 | {CPU1:10%; CPU2:10%} | {Bank2:0x0A000000-0x00AFFFFFF} | SDA1:/var/images/035-0004 |
| 340 | 0xA1 | {CPU1:12%} | {Bank0:0x00220000-0x0022FFFF} | SDA1:/var/images/161-0431 |
| 350 | 0xCB | {CPU0:5%; CPU2:20%} | {Bank1:0x0007A000-0x0007AFFF; Bank2:0x0B000000-0x00BFFFFFF} | SDA1:/var/images/203-0058 |
| 360 | ... | ... | ... | ... |

HARDWARE FAILURE MITIGATION

TECHNICAL FIELD

Various exemplary embodiments disclosed herein relate generally to system reliability and availability.

BACKGROUND

The rise of technologies such as virtualization and cloud computing has facilitated moving various applications previously associated with dedicated and standalone hardware onto machines providing shared hardware resources. This so-called "server consolidation" allows for a fuller utilization of available resources and, therefore, a decreased cost associated with unused resources. For example, by retiring servers that were previously only lightly utilized, energy consumption, floor space, and other server costs may be reduced.

Standalone servers, however, do provide other benefits. For example, standalone servers provide for rigid containment of hardware failures; if hardware associated with an application fails, then it may only affect that application. Server consolidation, however, introduces the possibility that a single hardware failure may impact multiple applications. For example, if four applications are sharing a CPU and if that CPU experiences a hardware failure, then all four applications may be compromised and unsalvageable.

SUMMARY

Various exemplary embodiments relate to a method performed by a resource allocation device that allocates server resources for mitigating the effects of hardware failure, the method including one or more of the following: detecting, by the resource allocation device, a failure of server hardware; identifying a first agent device that is configured to utilize the server hardware; and taking at least one action to effect a reconfiguration of the first agent device in response to the server hardware failure.

Various exemplary embodiments relate to a resource allocation device including one or more of the following: an agent device definition storage that stores a first agent device definition, wherein the first agent device definition identifies a first agent device and an associated server hardware resource; a hardware failure detector configured to detect a failure of the server hardware resource; and an agent device protection module configured to: identify, based on the agent device definition, the first agent device as being an agent device that is configured to utilize the server hardware resource, and take at least one action to effect a reconfiguration of the first agent device in response to the server hardware failure.

Various exemplary embodiments relate to a tangible and non-transitory machine-readable storage medium encoded with instructions for mitigating the effects of hardware failure, the tangible and non-transitory machine-readable storage medium including one or more of the following: instructions for detecting, by the resource allocation device, a failure of server hardware; instructions for identifying a first agent device that is configured to utilize the server hardware; and instructions for taking at least one action to effect a reconfiguration of the first agent device in response to the server hardware failure.

Various exemplary embodiments relate to a method performed by a hypervisor for mitigating the effects of hardware failure, the method including one or more of the following: detecting, by the hypervisor, a failure of server hardware; identifying a first virtual machine that is configured to utilize the server hardware; and taking at least one action to effect a reconfiguration of the first machine in response to the server hardware failure.

Various embodiments additionally include one or more of the following identifying a second agent device associated with the server hardware; and taking at least one action to effect a reconfiguration of the second agent device in response to the server hardware failure.

Various embodiments are described wherein the step of detecting a failure of server hardware includes: receiving, by the resource allocation device from a second agent device, an indication of the failure of server hardware, wherein the second agent device is different from the first agent device.

Various embodiments are described wherein the at least one action includes instructing a second resource allocation device to allocate server hardware resources for the first agent device. Various embodiments are described wherein the at least one action further includes transmitting, to the second resource allocation device, a device image associated with the first agent device. Various embodiments are described wherein the step of instructing the second resource allocation device includes transmitting an instruction message to the second resource allocation device via the Internet.

Various embodiments are described wherein the at least one action includes suspending an operation of the first agent device.

Various embodiments are described wherein the at least one action includes simulating an error for the first agent device. Various embodiments are described wherein the step of simulating an error for the first agent device includes transmitting, via the Internet, an error message to a device associated with the agent device.

BRIEF DESCRIPTION OF THE DRAWINGS

In order to better understand various exemplary embodiments, reference is made to the accompanying drawings, wherein:

FIG. 1b illustrates an alternative arrangement for some components of FIG. 1a;

FIG. 1c illustrates another alternative arrangement for some components of FIG. 1a;

To facilitate understanding, identical reference numerals have been used to designate elements having substantially the same or similar structure and/or substantially the same or similar function.

DETAILED DESCRIPTION

Figure 1A:
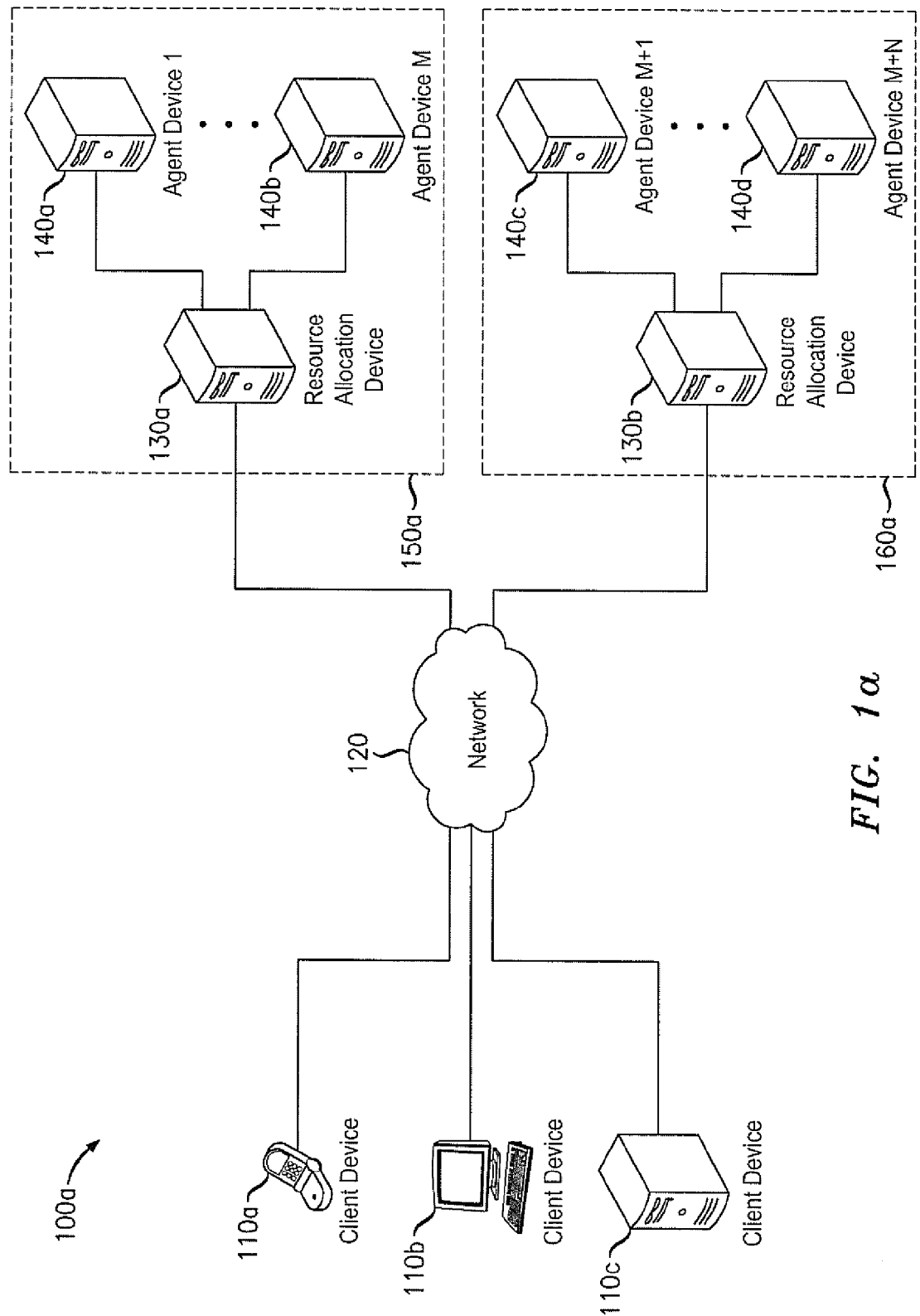
FIG. 1a illustrates an exemplary system for providing shared hardware resources.

In view of the foregoing, it would be desirable to provide a method of protecting agent devices sharing hardware resources from a failure of such resources. In particular, it would be desirable to enable continued operation of such agent devices while minimizing the possibility that the agent devices will be impacted by the failure. Referring now to the drawings, there are disclosed broad aspects of various exemplary embodiments.

FIG. 1a illustrates an exemplary system 100a for providing shared hardware resources. Exemplary system may include a number of client devices 110*a-c*, a network 120, resource allocation devices 130*a-b*, and a number of agent devices 140*a-d*. Resource allocation devices 130*a-b* and agent devices 140*a-d* may reside among one or more cloud computing infrastructure.

Client devices 110*a-c* may each include any device capable of communicating with a network such as network 120. While three devices are illustrated here, exemplary system 100*a* may include fewer or more devices. Further, the number of client devices participating in exemplary system 100*a* may change during operation. For example, client device 110*a* may cease participating in exemplary system 100*a* and/or another two client devices (not shown) may commence similar participation.

Each client device 110*a-c* may be a personal or laptop computer, terminal, server, tablet, wireless email device, cell phone, smart phone, television set-top box, or any other device capable of communicating with other devices via network 120. Each client device 110*a-c* may participate in exemplary system 100*a* for different reasons. For example, client device 110*a* may be a thin client and may rely on other resources within exemplary system to perform most or all processing related to the normal operation of client device 110*a*. As another example, client device 110*b* may be a personal computer capable of independently performing most tasks and may rely on other resources within exemplary system 100*a* to store and retrieve data such as, for example, a large music or ebook collection. As yet another example, client device 110*c* may be a server that receives and responds to requests from other devices (not shown). Client device 110*c* may rely on other resources within exemplary system 100*a* to process a portion of such requests when the rate at which such requests arrive is too high for client device 110*c* to process within some measure of efficiency, response time, or other metric for gauging server load.

Network 120 may be a device or group of devices adapted to provide communication between other devices of exemplary system 100*a*. Accordingly, network 120 may include a number of routers and/or switches for forwarding packets to appropriate destinations. In various embodiments, network 120 may include one or more 2G, 3G, and/or 4G systems and/or other wireless systems. Further, in various embodiments, network 120 may include wired networks such as the Internet and/or one or more local area networks (LANs).

Resource allocation devices 130*a-b* may each be a device that manages agent devices 140*a-d*. For example, resource allocation device 130*a* may manage agent devices 140*a-b*, while resource allocation device 130*b* may manage agent devices 140*c-d*. In managing such agent devices 140*a-d*, resource allocation devices 130*a-b* may assign and/or enforce shared hardware resources with respect to each agent device 140*a-d*. For example, resource allocation device 130*a* may ensure that agent device 1 140*a* may use 20% of the processing time on a first CPU while agent device M 140*b* may use 10% of the processing time on the same CPU. Accordingly, in various embodiments, resource allocation devices 130*a-b* may each include a hypervisor. Resource allocation devices 130*a-b* may perform numerous additional functions such as, for example, request and response message routing, resource reservation, load balancing, usage metering, and/or charging. Note that while exemplary system 100*a* includes two resource allocation devices 130*a-b*, various embodiments may include fewer or more resource allocation devices (not shown)

Agent devices 140*a-d* may each be devices configured to operate in conjunction with one or more of client devices 110*a-c*. Each agent device 140*a-d* may include hardware resources such as one or more processors, memory, storage, and/or network interfaces. In various embodiments, agent devices 140*a-d* may share such hardware resources with other agent devices 140*a-d* and/or resource allocation devices 130*a-b*. For example, agent device 1 140*a* may share a CPU with resource allocation device 130*a* and agent device M 140*b*. Such hardware resources may be disposed among one or more physical servers (not shown). In various embodiments, one or more of agent devices 140*a-d* may include a virtual machine.

Figure 1C:
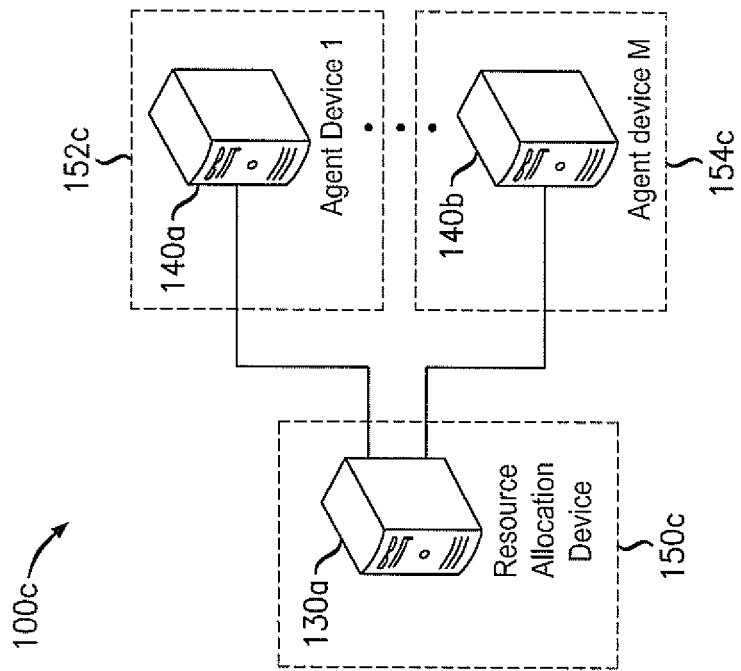
Figure 1B:
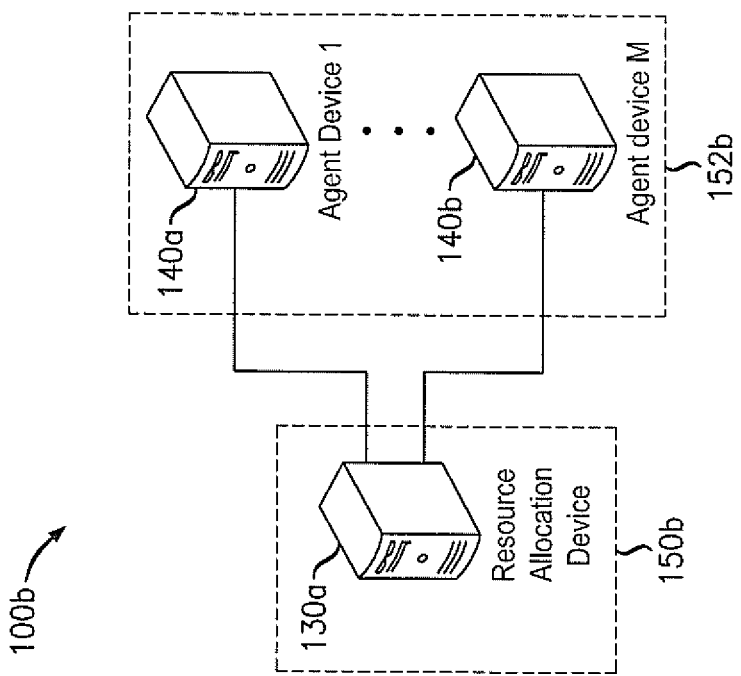

According to some embodiments, resource allocation devices 130*a-b* may reside together on the same physical servers as the agent devices 140*a-d* that they manage. For example, resource allocation device 130*a* and agent devices 140*a-b* may reside together on a single physical server 150*a*. In such embodiments, resource allocation device 130*a* may include a hypervisor while agent devices 140*a-b* may each include a virtual device, all of which may execute on a single physical server. Likewise, resource allocation device 130*b* and agent devices 140*c-d* may reside together on another physical server 160*a*. It should be apparent, however, that the methods described herein may be applied to various alternative configurations. For example, alternative configuration 100*b* as illustrated in FIG. 1*b*, shows that resource allocation device 130*a* may reside on a first physical server 150*b* while agent devices 140*a-b* may all reside on a second physical server 152*b*. As another alternative, alternative configuration 100*c* as illustrated in FIG. 1*c* shows that resource allocation device 130*c* and agent devices 140*a-b* may each reside on an independent physical server 150*c*, 152*c*, 154*c*, respectively. Various additional arrangements may be apparent to those of skill in the art.

Returning to FIG. 1*a*, resource allocation devices 130*a-b* may be configured to proactively protect agent devices 140*a-d* upon detection of a hardware failure. Resource allocation devices 130*a-b* may detect such a hardware failure by numerous methods such as, for example, receiving an interrupt, failing to receive one or more heartbeat response signals from a hardware device, reading one or more status registers, identifying a non-responsive hardware device, and/or receiving an error indication when attempting to access a hardware device. Numerous additional methods for hardware failure detection will be apparent to those of skill in the art.

Upon detecting a hardware failure, a resource allocation device 130*a-b* may first identify any agent devices that may potentially be impacted by the failure. For example, resource allocation device 130*a-b* may determine which agent devices are currently assigned to utilize at least a share of the failed hardware device. In various alternative embodiments, all agent devices 140*a-d* managed by a resource allocation device may be assumed to be potentially impacted. For each potentially impacted agent device 140*a-d*, resource allocation device 130*a-b* may take steps to protect the agent device 140*a-d* from the hardware failure such as, for example, live migrating the agent device 140*a-d* to another resource allocation device 130*a-b*, suspending operation of the agent device 140*a-d*, and/or simulating a hardware error for the agent device 140*a-d*.

In the case of live migration, the resource allocation device 130*a-b* that detects the hardware failure may communicate with another resource allocation device 130*a-b* to move one or more agent devices to the other resource allocation device 130*a-b*. For example, upon detecting a hardware error and determining that it could impact agent device 1 140*a*, resource allocation device 130*a* may instruct resource allocation device 130*b* to instantiate a new agent device (not shown) to take the place of agent device 140*a*. Resource allocation device 130a may further transmit a device image to resource allocation device 130b such that the new agent device may be created with the same processor state, memory contents, and/or other state as agent device 1 140a held recently, thereby minimizing the effects of migrating the agent device 140a to utilize new hardware.

In the case of suspending operation or simulating an error, resource allocation device 130a-b may prompt some other entity to take further action to isolate the agent device 140a-d from the error. For example, resource allocation device 130a may detect a hardware failure and, in response, simulate an error of agent device 1 140a by transmitting a message indicating such to client device 110a (assuming that client device 110a is associated with agent device 1 140a). Thereafter, client device 110a may rely on other techniques to handle the error such as, for example, directing requests to a redundant agent device such as agent device M+1 140c.

In another example, resource allocation device 130a may detect a hardware failure and determine that agent device M 140b may potentially be impacted. In response, resource allocation device 130a may suspend operation of agent device M 140b. Thereafter, another device such as, for example, client device 110c or agent device M+N 140d may attempt to communicate with agent device M 140b and receive no response. Thereafter, this other device may take steps to handle the non-responsive agent device 140b. Accordingly, by employing these methods, resource allocation device 130a may activate error handling features of other devices before an agent device is actually impacted by a hardware error.

Figures 2, 3:
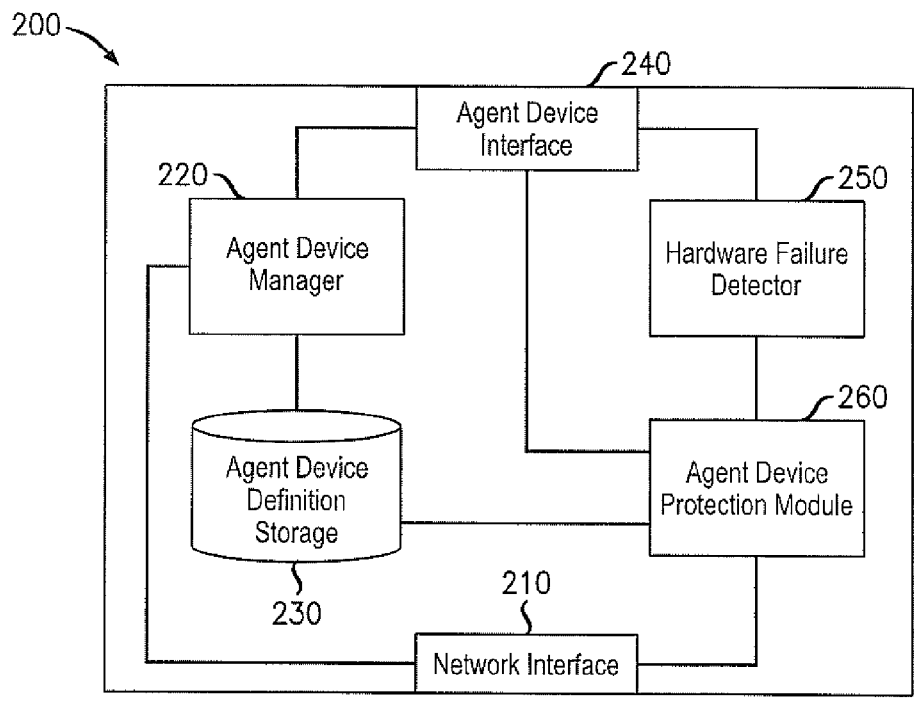
FIG. 2 illustrates an exemplary resource allocation device for protecting agent devices from hardware failure.
FIG. 3 illustrates an exemplary data arrangement for storing a number of agent device definitions.

FIG. 2 illustrates an exemplary resource allocation device 200 for protecting agent devices from hardware failure. Resource allocation device 200 may correspond to either or both resource allocation devices 130a-b of system 100a. Resource allocation device 200 may include a network interface 210, agent device manager 220, agent device definition storage 230, agent device interface 240, hardware failure detector 250, and agent device protection module 260.

Network interface 210 may be an interface including hardware and/or executable instructions encoded on a machine-readable storage medium configured to communicate with at least one other device. For example, network interface 210 may communicate with a client device, agent devices, and/or other resource allocation devices. Accordingly, network interface 210 may include one or more Ethernet interfaces for communication via a network such as the Internet. Further, network interface 210 may include numerous interfaces having differing addresses, having differing protocols, and/or belonging to different physical servers. Further, resource allocation device 200 may share network interface 210 or portions thereof with other entities such as, for example, agent devices.

Agent device manager 220 may include hardware and/or executable instructions on a machine-readable storage medium configured to establish and manage agent devices. In various embodiments, agent device manager 220 may receive requests for the establishment of various agent devices and subsequently establish the requested agent devices at least in part by creating an agent device definition. In doing so, agent device manager 220 may allocate a share of hardware resources to each new agent device based upon the request, the client device, subscriber privileges, available hardware resources, and/or various other considerations. Agent device manager 220 may then store this definition in agent device definition storage 230. Agent device manager 220 may perform various additional functions such as, for example, message routing between agent devices and other devices accessible via network interface 210 and/or enforcement of assigned hardware resources.

Agent device definition storage 230 may be any machine-readable medium capable of storing various agent device definitions. Accordingly, agent device definition storage 230 may include a machine-readable storage medium such as read-only memory (ROM), random-access memory (RAM), magnetic disk storage media, optical storage media, flash-memory devices, and/or similar storage media. The contents of agent device definition storage 230 will be explained in greater detail below with respect to FIG. 3.

Agent device interface 240 may be an interface including hardware and/or executable instructions encoded on a machine-readable storage medium configured to communicate with at least one agent device. In various embodiments, agent device interface 240 may include one or more methods of communication provided by an operating system or other environment. For example, agent device interface 240 may include sockets, pipes, message queues, and/or shared memory. Alternatively or additionally, agent device interface 240 may include interfaces such as a system bus, SCSI, SATA, PATA, USB, IEEE 1394, and/or a network interface such as an Ethernet interface. Accordingly, in various embodiments, agent device interface 240 may include network interface 210.

Hardware failure detector 250 may include hardware and/or executable instructions on a machine-readable storage medium configured to detect a failure of hardware associated with resource allocation device 200 and/or one or more agent devices. For example, one or more agent devices associated with resource allocation device 200 may be configured to transmit an interrupt upon encountering a hardware error. Hardware failure detector 250 may receive such an interrupt and, consequently determine that a hardware failure has occurred. Additionally or alternatively, hardware failure detector 250 may periodically poll hardware devices and/or receive a heartbeat signal from hardware devices. Failure to receive one or more polling responses and/or heartbeat signals may indicate to hardware failure detector 250 that a hardware failure has occurred. Numerous additional or alternative methods of detecting hardware failures will be apparent to those of skill in the art such as, for example, reading hardware status registers, encountering nonresponsive hardware, and/or receiving an error upon attempted access to a hardware device. Upon detecting a hardware failure, hardware failure detector 250 may report the failed device to agent device protection module 260.

Agent device protection module 260 may include hardware and/or executable instructions on a machine-readable storage medium configured to identify agent devices that may be impacted by a hardware failure and to subsequently take steps to avoid such impact. Upon receiving an indication from hardware failure detector 250 that a particular hardware device has failed or is failing, agent device protection module 260 may identify any agent devices that are allocated a share of the failed hardware device or may be otherwise impacted. For example, agent device protection module 260 may iterate through agent device definition storage and identify any agent device associated with the failed hardware. Alternatively, agent device protection module may simply assume that any agent device associated with resource allocation module 200 may potentially be impacted.

After identifying the potentially impacted agent devices, agent device protection module 260 may take some protection action with regard to each identified agent device. Agent device protection module 260 may take the same action with respect to each identified device or may determine that a different protection action is appropriate for different agent devices. In various embodiments, agent device protection module 260 may reallocate resources for an agent device such that the agent device no longer utilizes the failed hardware. Alternatively or additionally, agent device protection module may suspend the operation of agent devices and/or simulate an error with regard to the agent device. In doing so, agent device protection module 260 may prompt other entities (not shown) to take remedial action prior to the hardware failure actually impacting the agent device.

As another alternative or additional protection action, agent device protection module 260 may live migrate one or more agent devices to another resource allocation device. For example, agent device protection module 260 may transmit an instruction to another resource allocation device that hardware should be allocated for a replacement agent device. In doing so, agent device protection module 260 may transmit information defining the agent device such as hardware requirements. Agent device protection module 260 may also transmit a device image for duplicating a context of the agent device being migrated to the replacement agent device. In various embodiments, agent device protection module 260 may create such a device image upon receiving the indication of a hardware failure or periodically during normal operation of the agent device. In various embodiments, agent device protection module may transmit an agent device definition, or portion thereof, stored in agent device definition storage. Using whatever information is transmitted, another resource allocation device (not shown) may establish a copy of the agent device, thereby migrating the agent device to new hardware.

FIG. 3 illustrates an exemplary data arrangement 300 for storing a number of agent device definitions. Data arrangement 300 may be a table in a database or cache such as agent device definition storage 230. Alternatively, data arrangement 300 may be a series of linked lists, an array, or a similar data structure. Thus, it should be apparent that data arrangement 300 is an abstraction of the underlying data; any data structure suitable for storage of this data may be used.

Data arrangement 300 may include numerous fields for defining an agent device. For example, data arrangement 300 may include agent device ID field 305, processor resources field 310, memory resources field 315, and device image field 320. Data arrangement 300 may include numerous additional fields for storing additional information such as, for example, additional resources, associated client devices and/or users, and/or originally requested resources. Alternative or additional data useful in defining an agent device will be apparent to those of skill in the art.

Agent device ID field 305 may store a unique identifier for each agent device managed by a resource allocation device. Processor resources field 310 may store an indication of what shares of available processors are available to an agent device. Likewise, memory resources field 315 may store an indication of what share of available memory devices are available to an agent device. Device image 320 may specify a recent device image created in association with an agent device.

As an example, definition 330 indicates that agent device 0x23 is allocated 10% of the processing time on both CPU1 and CPU2. Further, agent device 0x23 has been allocated memory addresses 0xA000000-0xAFFFFFF on memory bank 2. An image stored on SDA1 at /var/images/035.0004 stores a recent device image of agent device 0x23. Definitions 340 and 350 similarly define the allocated resources and device image location for agent devices 0xA1 and 0xCB, respectively. Data arrangement 300 may include numerous additional definitions 360.

Figure 4:
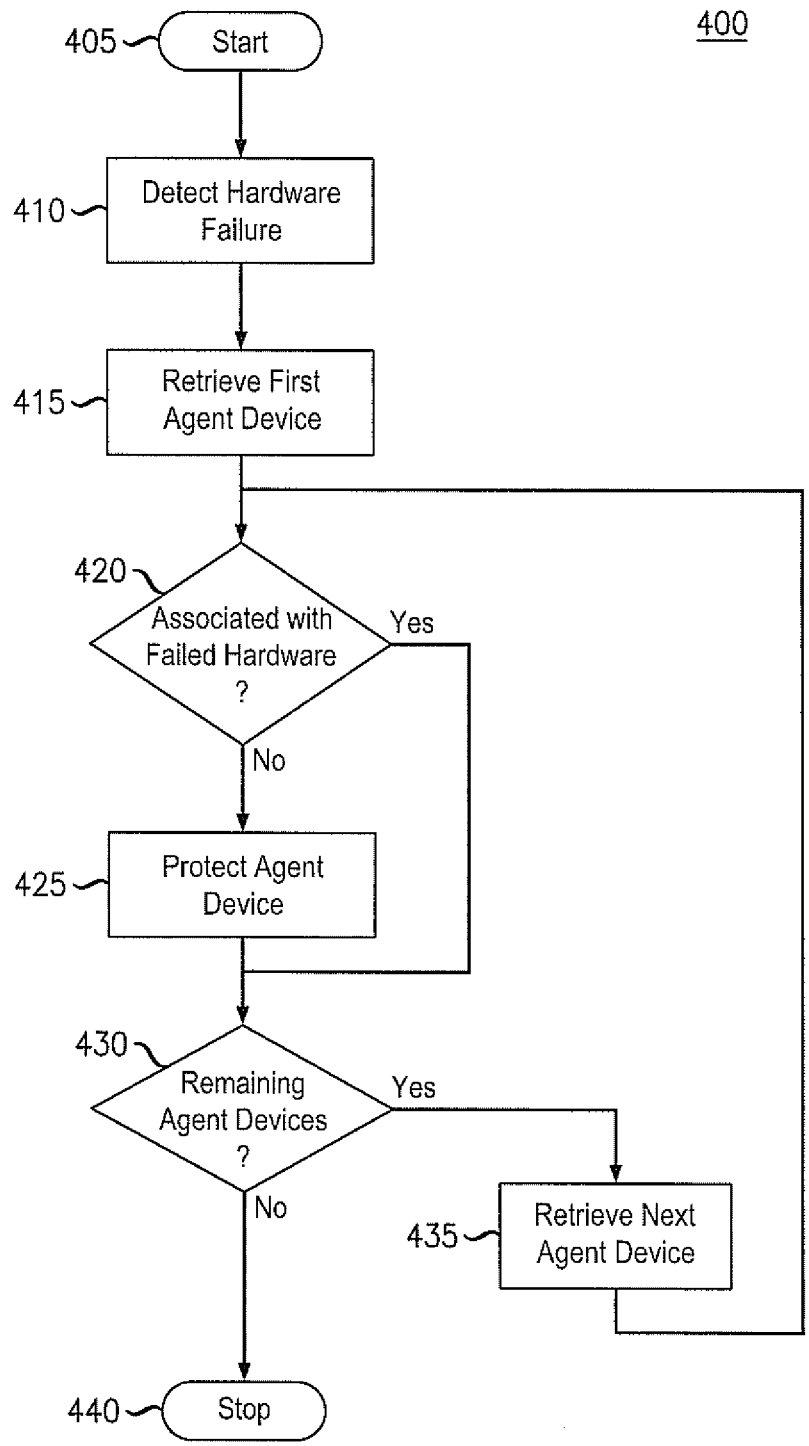
FIG. 4 illustrates an exemplary method for protecting agent devices from a hardware failure.

FIG. 4 illustrates an exemplary method 400 for protecting agent devices from a hardware failure. Method 400 may be performed by the components of resource allocation device 200 such as, for example, hardware failure detector 250 and/or agent device protection module 260.

Method 400 may begin in step 405 and proceed to step 410 where resource allocation device 200 may detect a hardware failure according to any of the methods described above. Next, in step 415, resource allocation device 200 may retrieve a first agent device for analysis. For example, resource allocation device 200 may retrieve an agent device definition. Then, in step 420, resource allocation device 200 may determine whether the retrieved agent device is associated with the failed hardware. If not, method 400 may skip to step 430. If the retrieved agent device is associated with the failed hardware, method 400 may proceed to step 425. In various alternative embodiments, step 420 may not be present, and step 415 may proceed directly to step 425. Accordingly, in such alternative embodiments, resource allocation device 200 may perform step 425 for every associated agent device.

In step 425, resource allocation device 200 may perform one or more action to protect the current agent device from the hardware failure. As described above, resource allocation device 200 may allocate different resources to the agent device, suspend the agent device, simulate an error for the agent device, or migrate the agent device to another resource allocation device. Various alternative methods of protecting an agent device may be apparent to those of skill in the art.

In step 430, resource allocation device 200 may determine whether any agent devices remain to be processed in light of the hardware error. If so, resource allocation device 200 may retrieve the next agent device and method 400 may loop back to step 420. Once all agent devices are processed, method 400 may proceed from step 430 to end in step 440.

Having described various embodiments, an example of the operation of system 100a will now be described with reference to FIGS. 1-4. For the purposes of this example, resource allocation device 200 may correspond to resource allocation device 130a, data arrangement 300 may describe the contents of agent device definition storage 230, and method 400 may describe the operation of resource allocation device 200. Definition 330 may correspond to agent device 1 140a which may be associated with client device 110a. Agent device M+1 140c may also be associated with client device and may be a redundant copy of agent device 1 140a currently operating in passive mode.

In step 410, hardware failure detector 250 may receive an indication from agent device 0xCB that CPU2 has failed. In step 420, agent device protection module 260 may determine that, according to definition 330, agent device 0x23 is associated with CPU2 and, therefore, is likely to be impacted by the hardware failure. In response, agent device protection module 260 may take protective action by transmitting a message to client device 110a to simulate a critical error on agent device 1 140a. Client device 110a may then respond by placing redundant agent device M+1 140c in active mode and redirecting any processing requests to that agent device 140c.

Next, method 400 may loop back to step 420 where agent device protection module may determine that, according to definition 340, agent device 0xA1 is not associated with CPU2. Accordingly, resource allocation device 200 may take no further action with respect to agent device 0xA1. Processing may continue in this manner until resource allocation device 200 analyzes all definitions stored in data arrangement 300.

According to the foregoing, various embodiments enable a resource allocation device to proactively protect agent devices from being impacted by a hardware failure. In particular, by identifying agent devices associated with hardware for which a failure has been reported, a resource allocation device may take steps to protect the agent device prior to the hardware failure actually impacting the agent device.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a resource allocation device that allocates server resources for mitigating the effects of server hardware failure, the method comprising:
    detecting, by the resource allocation device, a failure of server hardware;
    identifying a first agent device that is configured to utilize the server hardware, wherein the first agent device comprises a virtual device capable of configuration to utilize a different server hardware; and
    taking at least one action to effect a reconfiguration of the first agent device in response to the server hardware failure and prior to the first agent device being impacted by the failure of the server hardware.

2. The method of claim 1, further comprising:
    identifying a second agent device that is configured to utilize the server hardware; and
    taking at least one action to effect a reconfiguration of the second agent device in response to the server hardware failure.

3. The method of claim 1, wherein the step of detecting a failure of server hardware comprises:
    receiving, by the resource allocation device from a second agent device, an indication of the failure of server hardware, wherein the second agent device is different from the first agent device.

4. The method of claim 1, wherein the at least one action comprises instructing a second resource allocation device to allocate different server hardware resources for the first agent device.

5. The method of claim 4, wherein the step of instructing the second resource allocation device comprises transmitting an instruction message to the second resource allocation device via the Internet.

6. The method of claim 1, wherein the at least one action comprises suspending an operation of the first agent device.

7. The method of claim 1, wherein the at least one action comprises simulating an error for the first agent device.

8. The method of claim 7, wherein the step of simulating an error for the first agent device comprises transmitting, via the Internet, an error message to a device associated with the agent device.

9. A resource allocation device comprising:
    an agent device definition storage that stores a first agent device definition, wherein the first agent device definition identifies a first agent device and an associated server hardware resource, wherein the first agent device comprises a virtual device capable of configuration to utilize a different server hardware resource;
    a hardware failure detector configured to detect a failure of the server hardware resource; and
    an agent device protection module configured to:
        identify, based on the agent device definition, the first agent device as an agent device that is configured to utilize the server hardware resource, and
        take at least one action to effect a reconfiguration of the first agent device in response to the server hardware failure and prior to the first agent device being impacted by the failure of the server hardware.

10. The resource allocation device of claim 9, wherein:
    the agent device definition storage stores a second agent device definition, wherein the second agent device definition identifies a second agent device and an associated server hardware resource; and
    the agent device protection module is further configured to:
        identify a second agent device as an agent device that is configured to utilize the server hardware resource; and
        take at least one action to effect a reconfiguration of the second agent device in response to the server hardware failure.

11. The resource allocation device of claim 9, wherein, in detecting a failure of server hardware, the hardware failure detector is configured to:
    receive, by the hardware failure detector from a second agent device, an indication of the failure of server hardware, wherein the second agent device is different from the first agent device.

12. The resource allocation device of claim 9, wherein the at least one action comprises instructing a second resource allocation device to allocate different server hardware resources for the first agent device.

13. The resource allocation device of claim 11, wherein the at least one action further comprises transmitting, to the second resource allocation device, a device image associated with the first agent device.

14. The resource allocation device of claim 11, wherein, in instructing the second resource allocation device, the agent device protection module transmits an instruction message to the second resource allocation device via the Internet.

15. The resource allocation device of claim 9, wherein the at least one action comprises suspending an operation of the first agent device.

16. The resource allocation device of claim 9, wherein the at least one action comprises simulating an error for the first agent device.

17. A tangible and non-transitory machine-readable storage medium encoded with instructions for mitigating the effects of server hardware failure, the tangible and non-transitory machine-readable storage medium comprising:
   instructions for detecting, by the resource allocation device, a failure of server hardware;
   instructions for identifying a first agent device that is configured to utilize the server hardware, wherein the first agent device comprises a virtual device capable of configuration to utilize a different server hardware resource; and
   instructions for taking at least one action to effect a reconfiguration of the first agent device in response to the server hardware failure and prior to the first agent device being impacted by the failure of the server hardware.

18. The tangible and non-transitory machine-readable storage medium of claim 17, further comprising:
   instructions for identifying a second agent device that is configured to utilize the server hardware; and
   instructions for taking at least one action to effect a reconfiguration of the second agent device in response to the server hardware failure.

19. The tangible and non-transitory machine-readable storage medium of claim 17, wherein the instructions for detecting a failure of server hardware comprise:
   instructions for receiving, by the resource allocation device from a second agent device, an indication of the failure of server hardware, wherein the second agent device is different from the first agent device.

20. The tangible and non-transitory machine-readable storage medium of claim 17, wherein the at least one action comprises instructions for instructing a second resource allocation device to allocate different server hardware resources for the first agent device.

21. The tangible and non-transitory machine-readable storage medium of claim 20, wherein the instructions for instructing the second resource allocation device comprise instructions for transmitting an instruction message to the second resource allocation device via the Internet.

22. The tangible and non-transitory machine-readable storage medium of claim 17, wherein the at least one action comprises instructions for suspending an operation of the first agent device.

23. The tangible and non-transitory machine-readable storage medium of claim 17, wherein the at least one action comprises instructions for simulating an error for the first agent device.

24. A method performed by a hypervisor for mitigating the effects of hardware failure, the method comprising:
   detecting, by the hypervisor, a failure of server hardware;
   identifying a first virtual machine that is configured to utilize the server hardware, wherein the first virtual machine is capable of configuration to utilize a different server hardware resource; and
   taking at least one action to effect a reconfiguration of the first virtual machine in response to the server hardware failure and prior to the first virtual machine being impacted by the failure of the server hardware.

25. The method of claim 24, further comprising:
   identifying a second virtual machine that is configured to utilize the server hardware; and
   taking at least one action to effect a reconfiguration of the second virtual machine in response to the server hardware failure.

26. The method of claim 24, wherein the step of detecting a failure of server hardware comprises:
   receiving, by the hypervisor from a second virtual machine, an indication of the failure of server hardware, wherein the second virtual machine is different from the first virtual machine.

27. The method of claim 24, wherein the at least one action comprises instructing a second hypervisor to allocate different server hardware resources for the first virtual machine.

28. The method of claim 27, wherein the step of instructing the second hypervisor comprises transmitting an instruction message to the second hypervisor via the Internet.

29. The method of claim 24, wherein the at least one action comprises suspending an operation of the first virtual machine.

30. The method of claim 24, wherein the at least one action comprises simulating an error for the first virtual machine.

* * * * *